United States Patent [19]
Liao

[11] Patent Number: 6,079,718
[45] Date of Patent: Jun. 27, 2000

[54] GOLF CLUB CART COLLAPSING DEVICE

[75] Inventor: Gordon Liao, Yung Kang, Taiwan

[73] Assignee: Unique Product & Design Co., Ltd., Tainan Hsien, Taiwan

[21] Appl. No.: 09/189,122

[22] Filed: Nov. 10, 1998

[51] Int. Cl.⁷ .................................................. B62B 1/12
[52] U.S. Cl. ................................ 280/47.26; 280/DIG. 6; 280/652
[58] Field of Search ...................... 280/47.26, DIG. 6, 280/40, 646, 652, 655

[56] References Cited

U.S. PATENT DOCUMENTS

| | | | |
|---|---|---|---|
| 4,289,326 | 9/1981 | Hawkes | 280/646 |
| 4,784,401 | 11/1988 | Raguet | 280/40 |
| 5,074,577 | 12/1991 | Kim | 280/646 |
| 5,421,604 | 6/1995 | Wu | 280/655 |
| 5,526,894 | 6/1996 | Wang | 280/646 |
| 5,582,372 | 12/1996 | Wu | 280/47.26 |
| 5,799,967 | 9/1998 | Lin | 280/646 |

Primary Examiner—Lanna Mai
Assistant Examiner—Ruth Ilan
Attorney, Agent, or Firm—Pro-Techtor International Services

[57] ABSTRACT

A golf club cart collapsing device includes an upper support rod and a lower support rod pivotally connected to each other by means of a male and a female connector, two link members two upper connect rods, an intermediate connect rod, two lower connect rods, a H-shaped frame, two wheel hangers, and two wheels with a shaft combined together by means of pivotal connection. The golf club cart may be collapsed from a spread condition to a collapsed condition, forming a space between the two wheel hangers and the wheel shafts for an electric driving mechanism to be installed. When it is spread from the collapsed condition to the spread condition, it is automatically stabilized at the same time by engagement of the male and the female connector.

2 Claims, 11 Drawing Sheets

GOLF CLUB CART COLLAPSING DEVICE

BACKGROUND OF THE INVENTION

This invention relates to a golf club cart collapsible device, particularly to one easy and quick to handle, secured at once when cart is spread out, and a substantial space left between two wheel hangers and wheel shafts after the golf cart is collapsed for installing an electric driving mechanism.

A known conventional golf club cart is shown in FIG. 1, including an upper support rod 1, a lower support rod 2 connected downward to the upper support rod 1, a connector 3 connecting the upper and the lower support rod 1 and 2. The connector 3 is fixed on a lower end of the upper support rod 1 and an upper end of the lower support rod 2. The upper and the lower support rods 1 and 2 to rest and are stabilized on the back of the connector 3 when they are spread out. Further, a tightener 4 should be fixed on the upper surface of the connector 3 to force the upper and the lower support rod 1 and 2 to be held in the spread out condition. Consequently, in collapsing, the tightener 4 has to be firstly loosened with a tool, and then pushed it to move laterally 90 degrees or so, as shown in FIG. 2, before the upper and the lower support rod 1 and 2 are disengaged from the connector 3. Then the upper and the lower support rod 1 and 2 can be collapsed, as shown in FIG. 3.

The known conventional golf club cart just described is not stabilized to the spread condition at once when it is spread out. The connector 3 has to be Pushed to rest on the connecting sections of the upper and the lower support rod 1 and 2, and further the tightener 4 has to be screwed tight to let the connector 3 tightly rest on them. This conventional gold club cart is not conveniently spread out, taking time in handling, as the tightener 4 has to be in advance loosened before the cart is collapsed by disengaging the connector 3 from the upper and the lower support rod 1 and 2. In addition, nearly no space is left between the two wheel hangers 5 and the wheel shafts 6 after it is collapsed, as shown in FIG. 3. It is impossible to install an electric driving mechanism, permitting it moved only manually. So this manually moving golf club cart is likely to become out of fashion, and to be substituted by an electric one.

SUMMARY OF THE INVENTION

The main purpose of the invention is to offer a kind of golf club cart collapsible device improving on the disadvantages of the known conventional one, easy and quick to handle in spreading and collapsing, spreading and stabilizing at the same time, and having enough space between the two wheel hangers and the wheel shafts for installing an electric driving mechanism therein.

The feature of the invention is an upper support rod and a lower support rod connected to a male connector and a female connector and pivotally connected to link members to spread to a straight line or collapsed to become separated apart to locate near each wheel. Two upper connect rods have upper ends pivotally connected respectively to the female connector and the male connector. An intermediate connect rod is pivotally connected to lower ends of the two upper connect rods. Two lower connect rods have inner ends pivotally connected to the two upper connect rods. Two wheel hangers have center portions respectively and pivotally connected to outer ends of the two lower connect rods. A H-shaped frame has two side ends respectively and pivotally connected to upper ends of the two wheel hangers. Two wheels respectively have a shaft pivotal ly connected to lower ends of the two wheel hangers. In collapsing the golf club cart, the female connector on the upper support rod is disengaged from the male connector on the lower support rod, then the upper end of the support rod is pushed downward with the pivotal point as a pivot. Consequently, the two upper connect rods are pulled upward, with the intermediate connect rod also lifted upward and the two lower connect rods also lifted upward to form an inverted V-shaped condition. Meanwhile, the upper and the lower support rods move near the two wheels, which also move nearer to each other to a collapsed position. Then the two lower rods and the intermediate rod are located high, and a rather large space is formed between the two wheel hangers and the wheel shafts for an electric driving mechanism to be installed. Engagement of the male and the female connector enables the spread position of the golf club cart to be stabilized, facilitating handling it.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
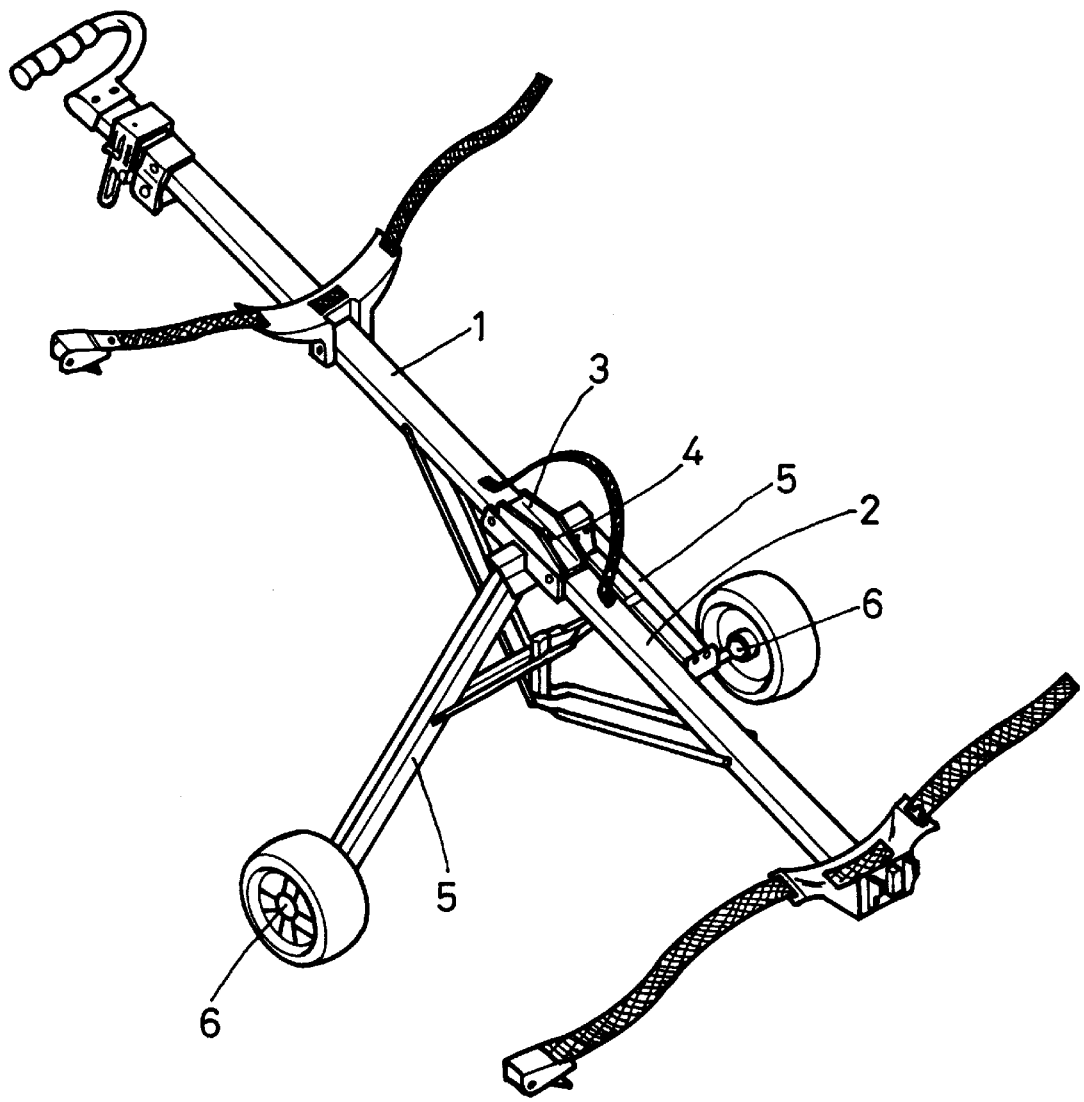
FIG. 1 is a perspective view of a known conventional golf club cart spread out.
Figure 2:
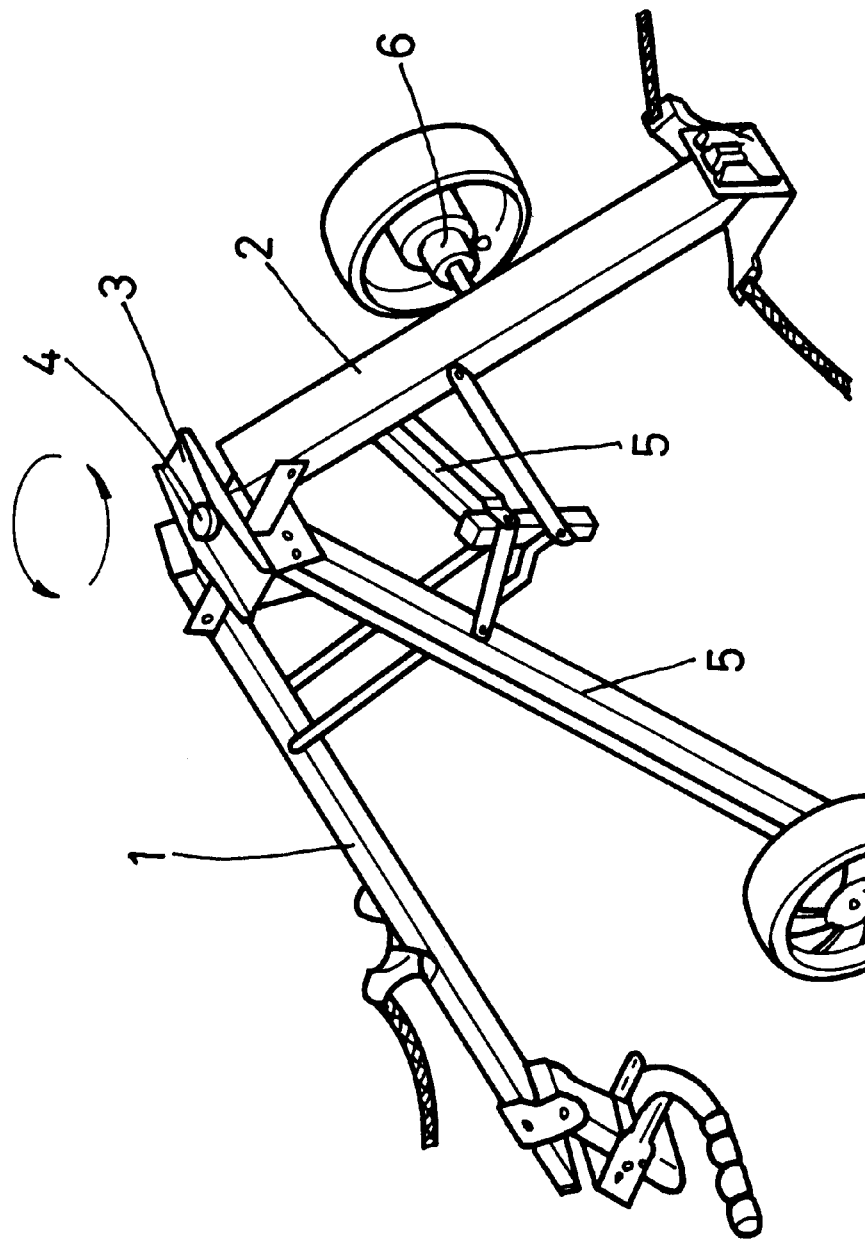
FIG. 2 is a perspective view of the known conventional golf club cart being half collapsed.
Figure 3:
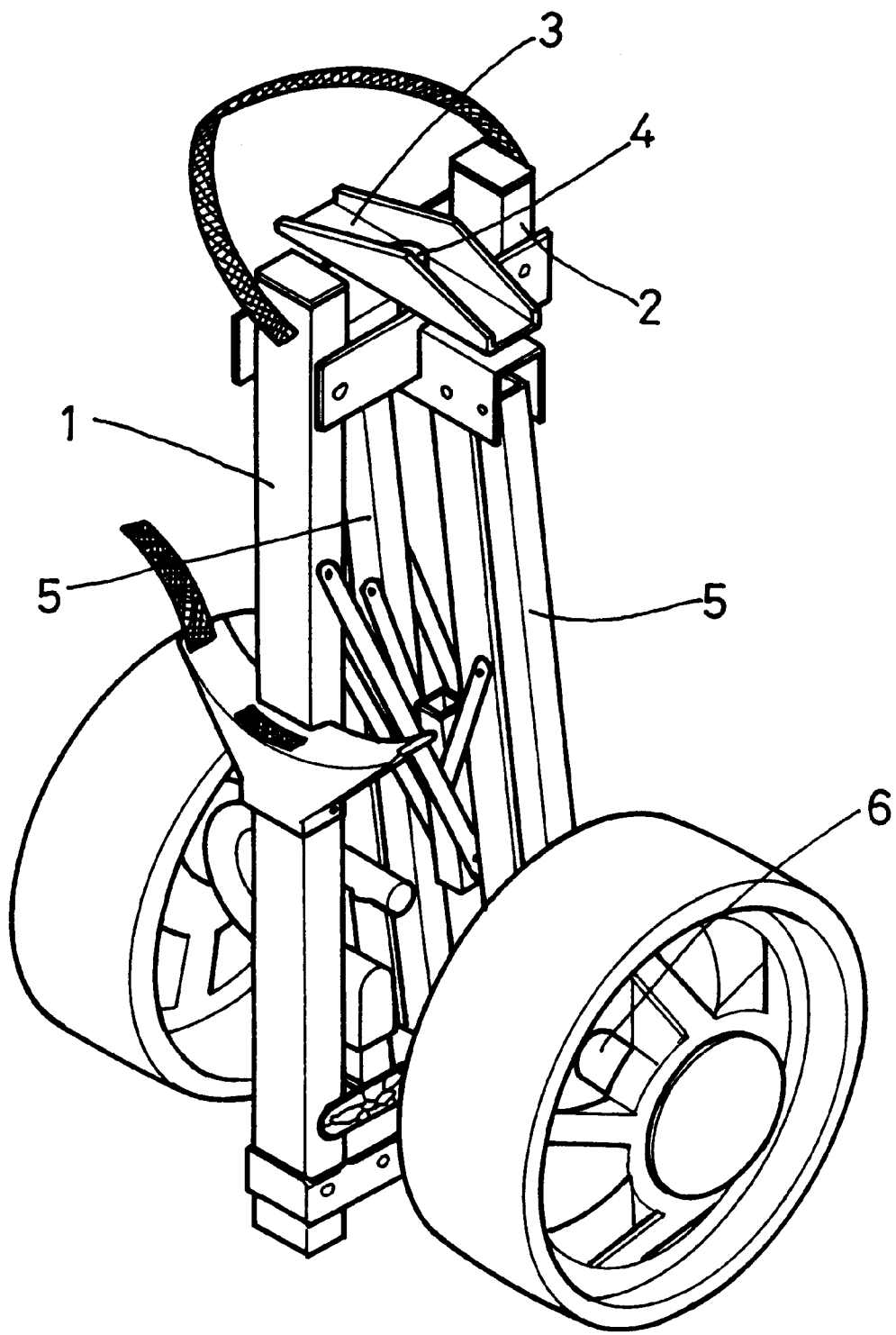
FIG. 3 is a perspective view of the known conventional gold club cart completely collapsed.
Figure 4:
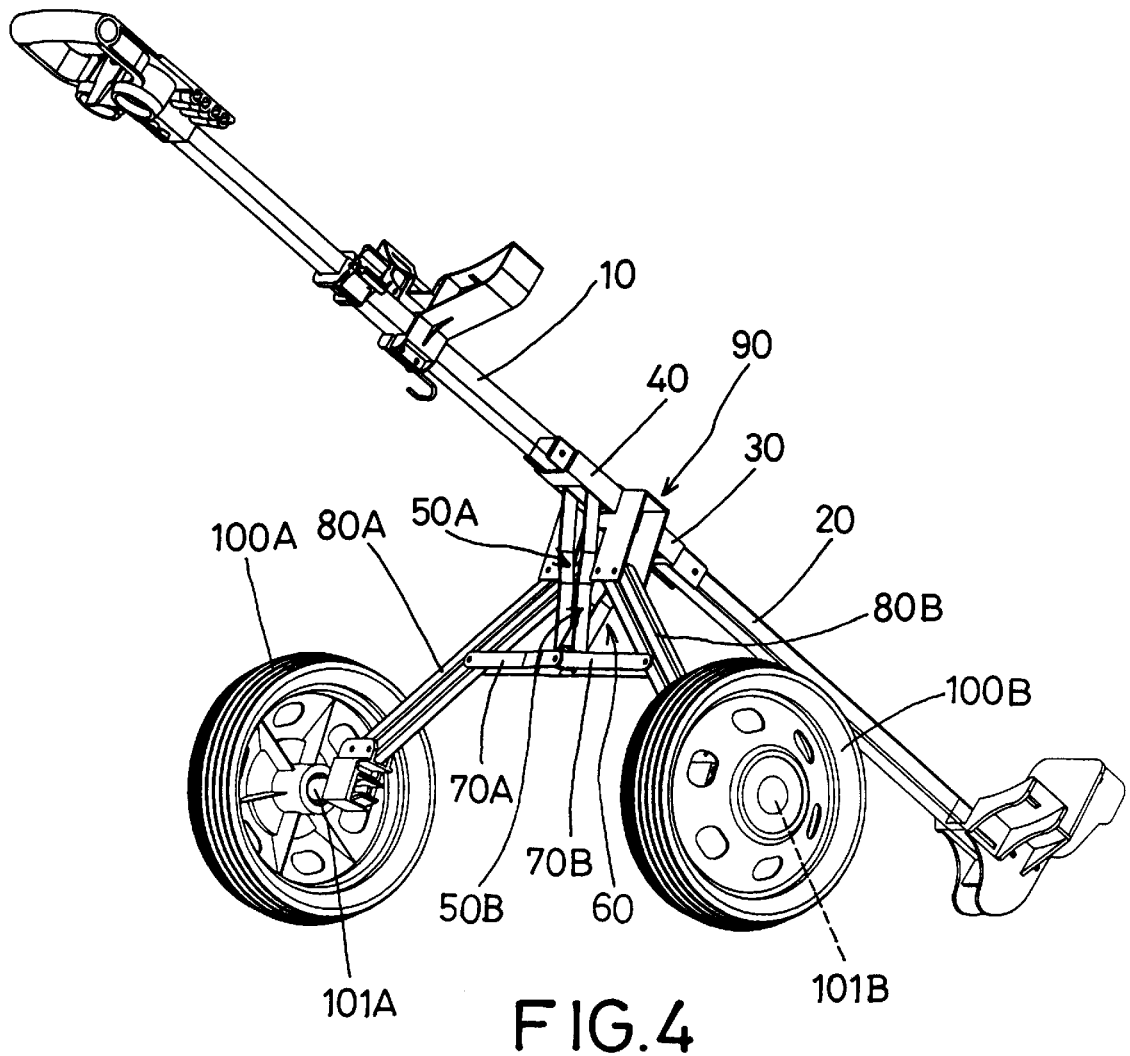
FIG. 4 is a perspective view of a golf club cart with a collapsible device in the present invention.

A preferred embodiment of a golf club cart collapsible device in the present invention, as shown in FIG. 4, includes an upper support rod 10, a lower support rod 20, a male connector 30, a female connector 40, two upper connect rods 50A, 50B, an intermediate connect rod 60, two lower connect rods 70A, 70B, two wheel hangers 80A, 80B, a H-shaped frame 90, and two wheels 100A, 100B. Link members 32 and 42 extend from opposite sides of the H-shaped frame, as shown in FIG. 8.

The lower support rod 20 is located to be connected under the upper support rod 10 in a sloped condition by engagement of the male connector 30 and the female connector 40.

Figure 8:
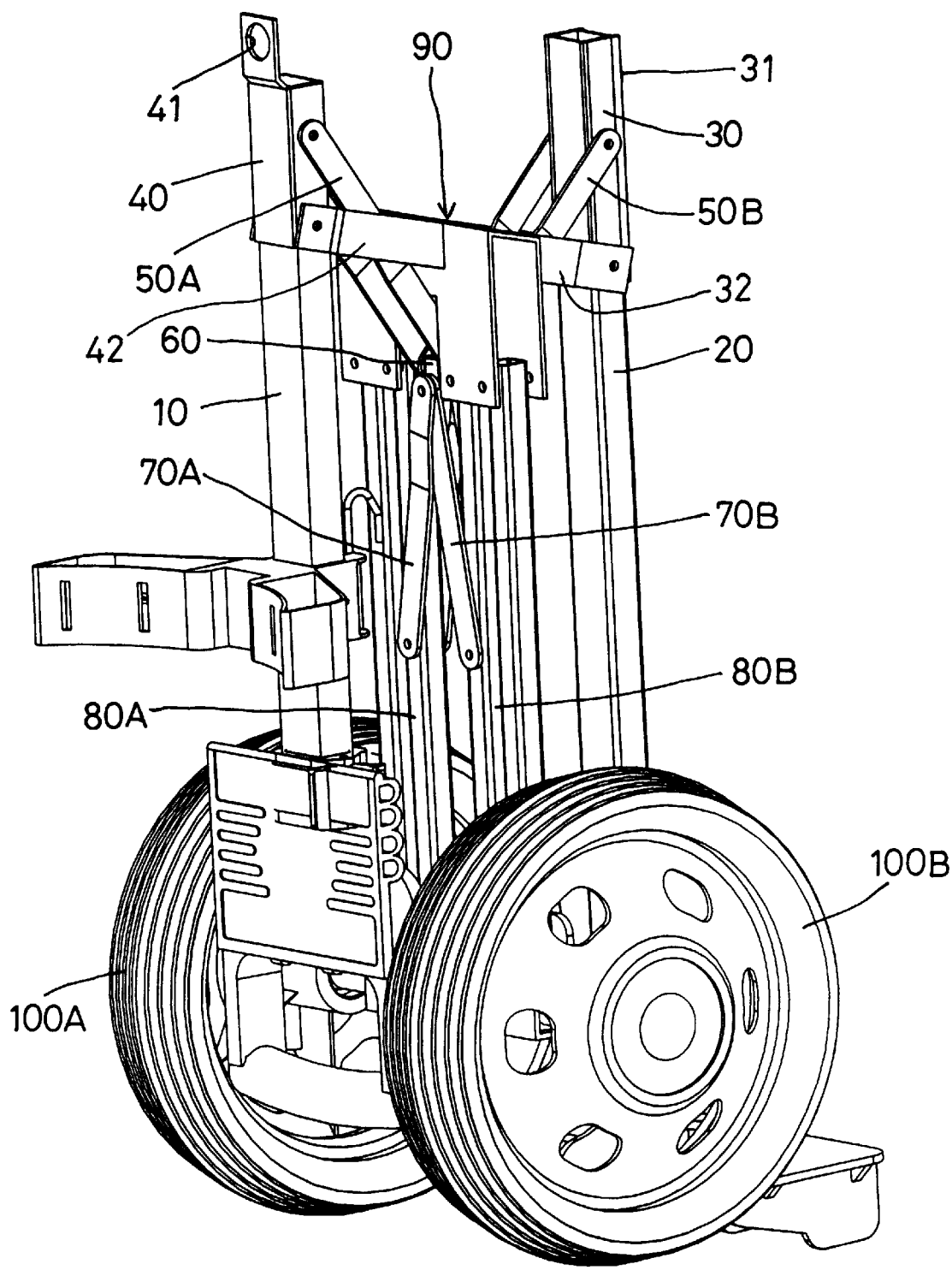
FIG. 8 is a perspective view of the golf club cart with the collapsible device in the collapsed condition in the present invention.
Figure 10:
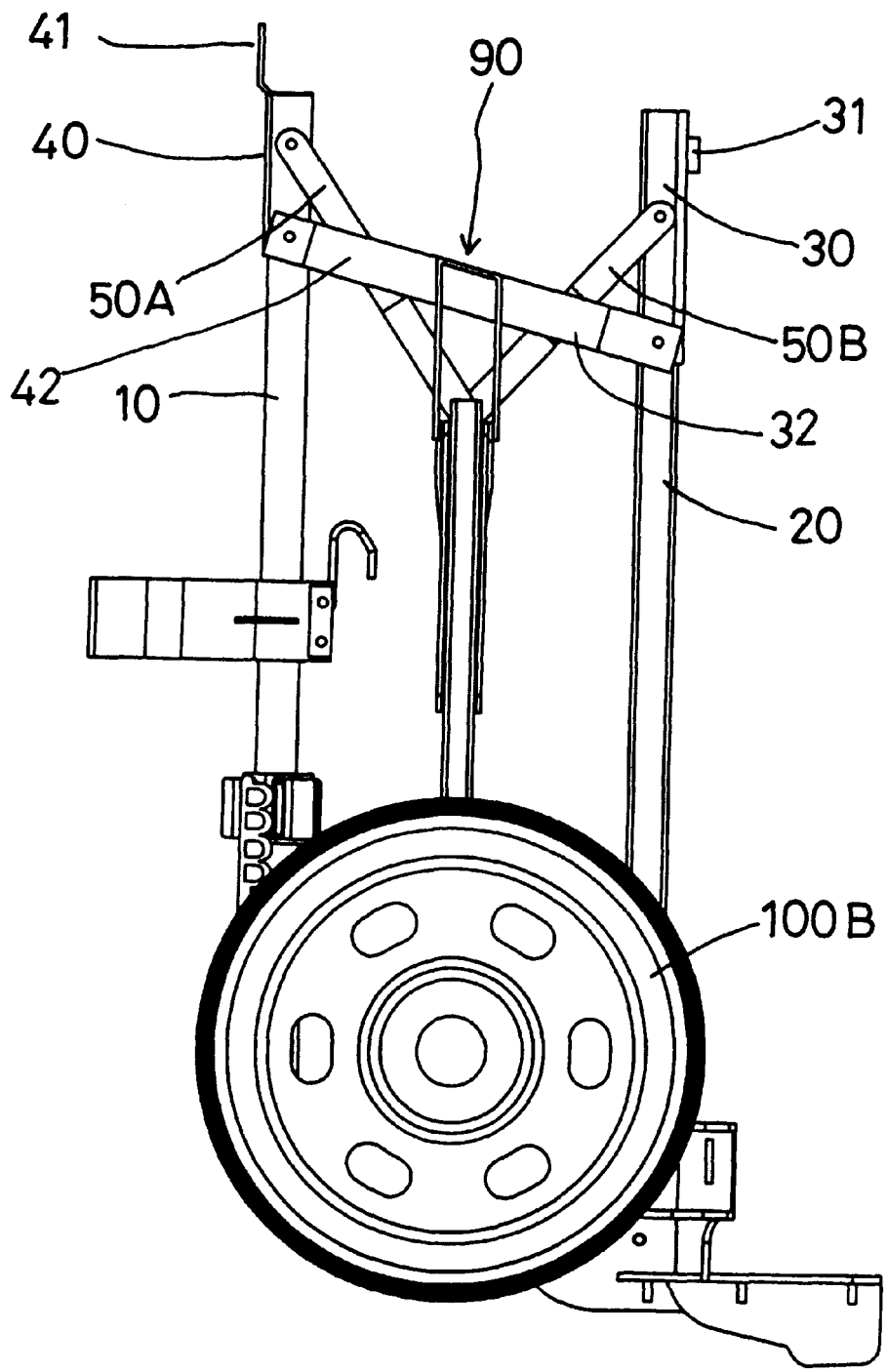
FIG. 10 is a side view of the arrow head A in FIG. 9.

The male connector 30 has a male projection 31 and is pivotally connected to link member 32, with FIGS. 8 and 10 referred to.

Figure 6:
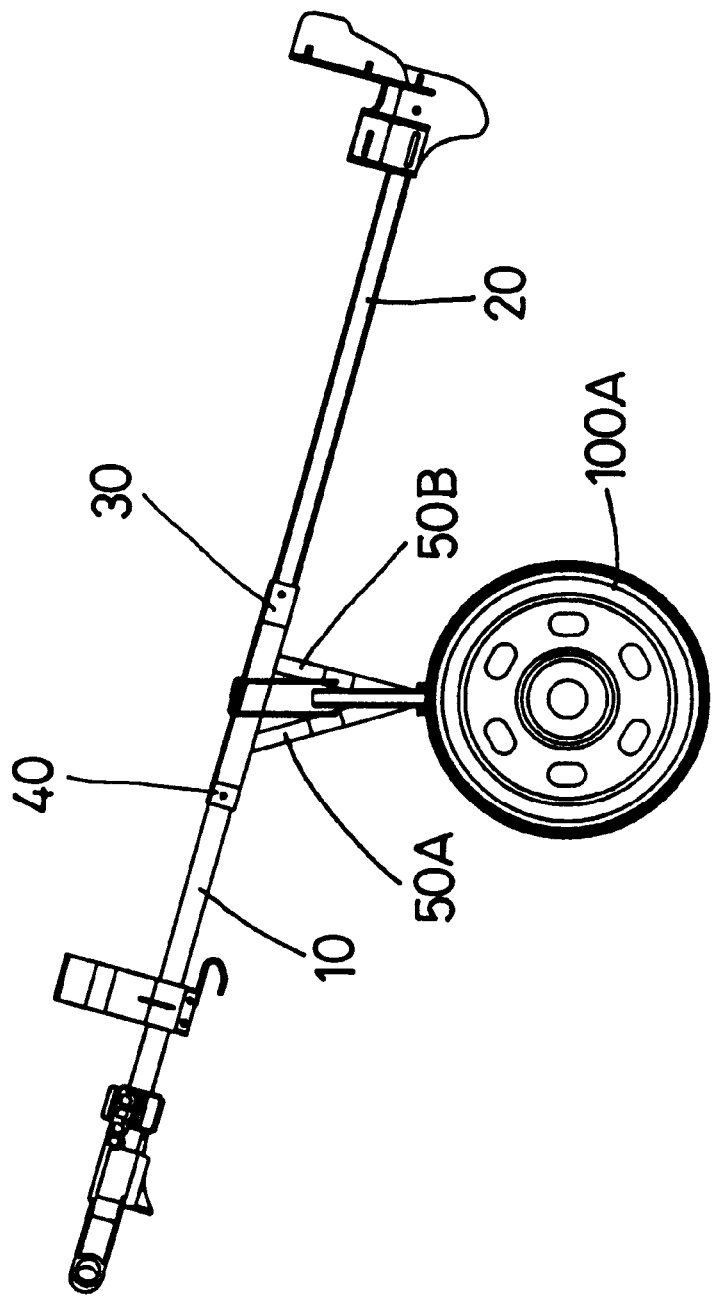
FIG. 6 is a side view of the golf club cart with the collapsible device in the present invention.
Figure 7:
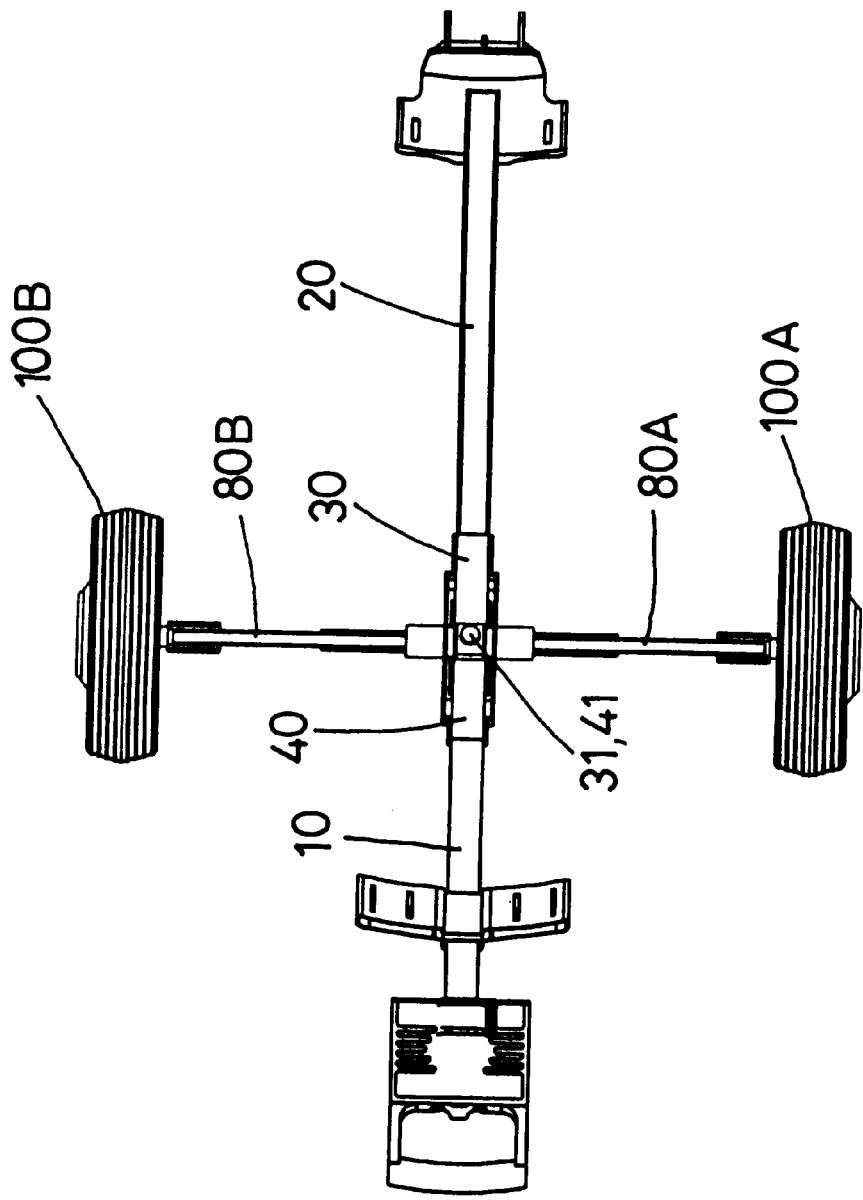
FIG. 7 is an upper view of the golf club cart with the collapsible device in the present invention.

The female connector 40 has a female hole 41 and is pivotally connected to link member 42 Female hole 41 is able to engage with the male projection 31 to keep stabilized the upper and the lower support rod 10 and 20 in a straight line when the golf club cart is spread out, as shown in FIGS. 6, 7 and 8.

The two upper connect rods 50A, 50B are respectively connected pivotally at an upper end to the male connector 30 and the female connector 40, with FIG. 8. also referred to.

The intermediate connect rod 60 is pivotally connected to the lower ends of the two upper connect rods 50A, 50B.

The two lower connect rods 70A, 70B are pivotally connected to the lower end of the intermediate connect rod 60 at their inner ends.

Figure 5:
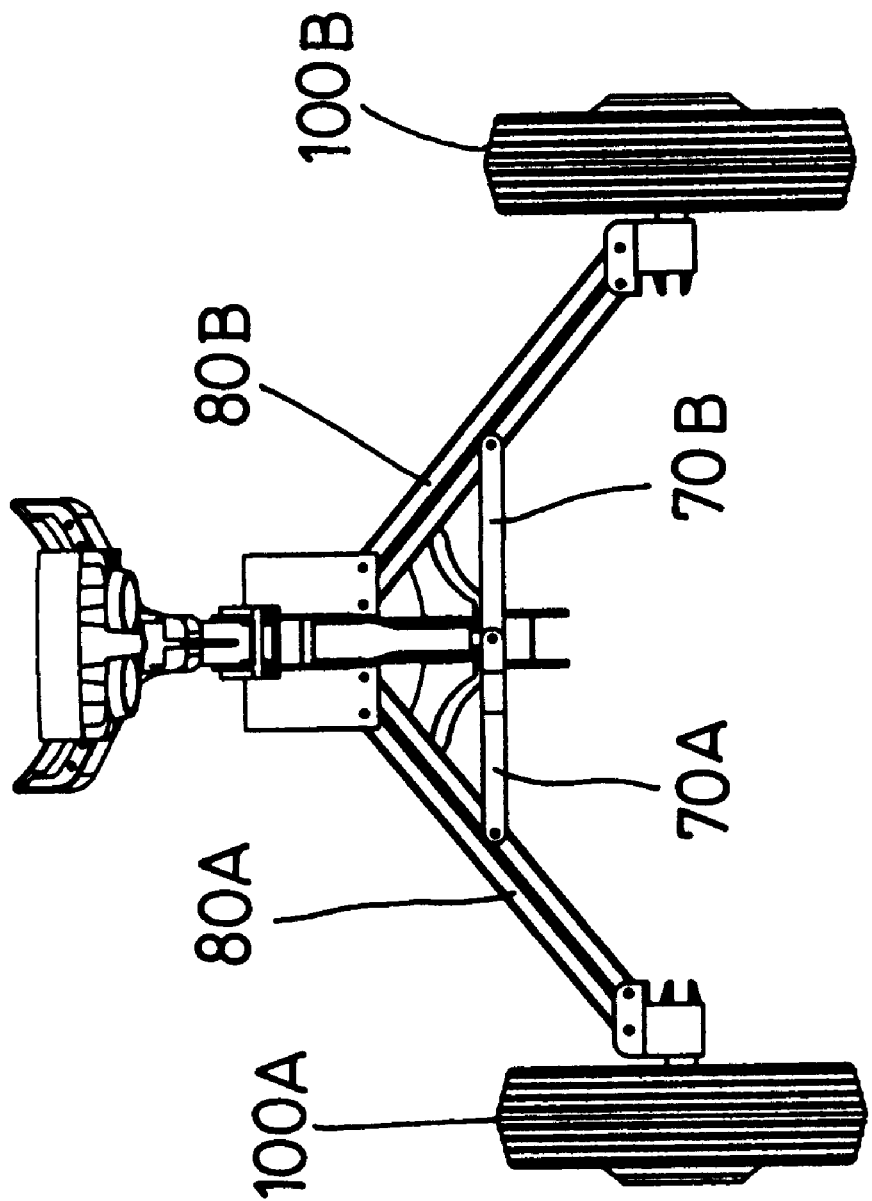
FIG. 5 is a front view of the golf club cart with the collapsible device in the present invention.

The two wheel hangers 80A, 80B are respectively and pivotally connected to an outer ends of the two lower connect rods 70A, 70B at their central portion, as shown in FIG. 5.

The H-shaped frame 90 has two side lower ends respectively connected to upper ends of the two wheel hangers 80A, 80B.

The two wheels 100A, 100B respectively have a shaft 101A, 101B connected pivotally to the lower ends of the wheel hangers 80A, 80B as shown in FIG. 4.

Figure 9:
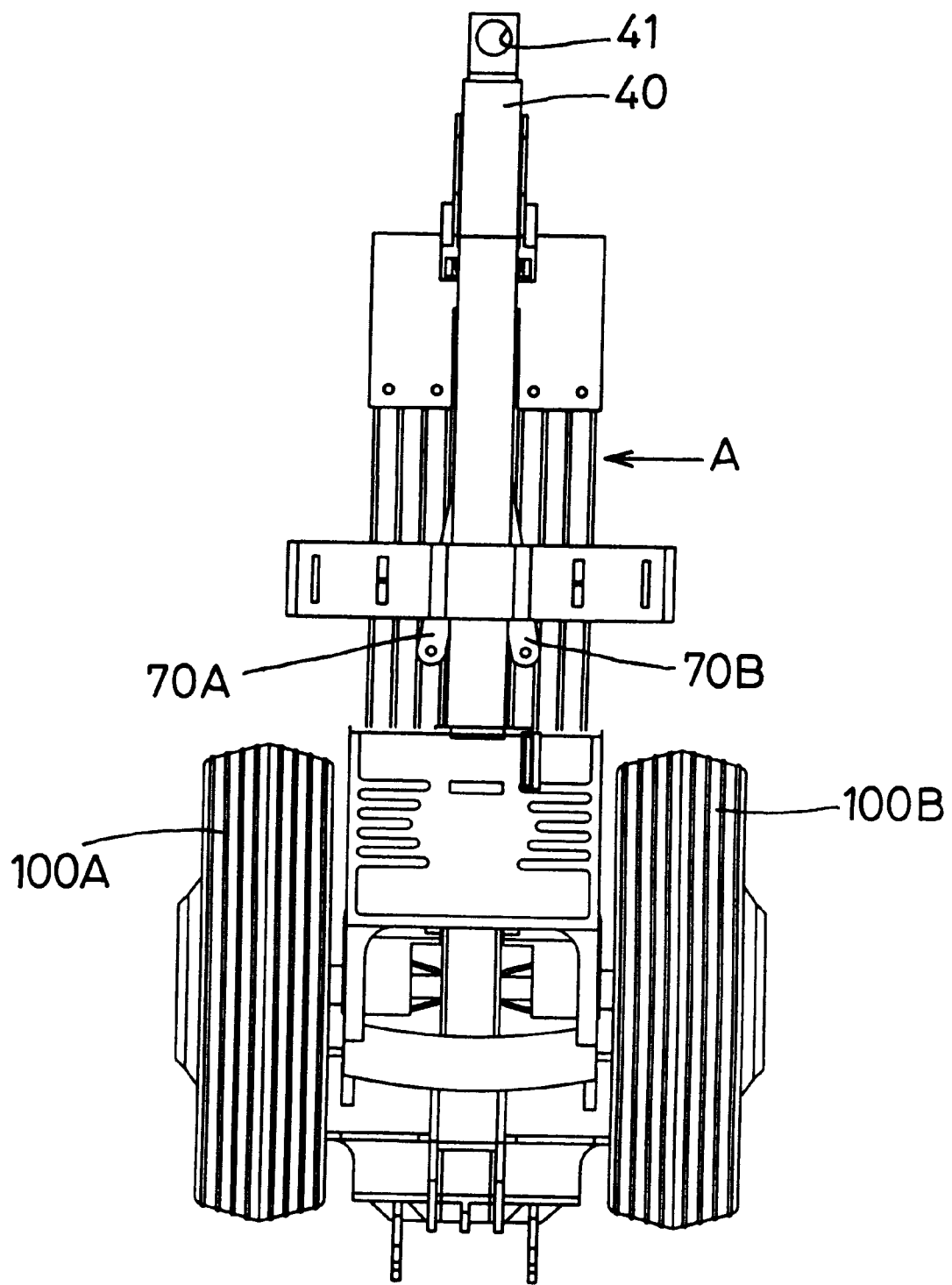
FIG. 9 is a front view of the golf club cart with the collapsible device in the collapsed condition.
Figure 11:
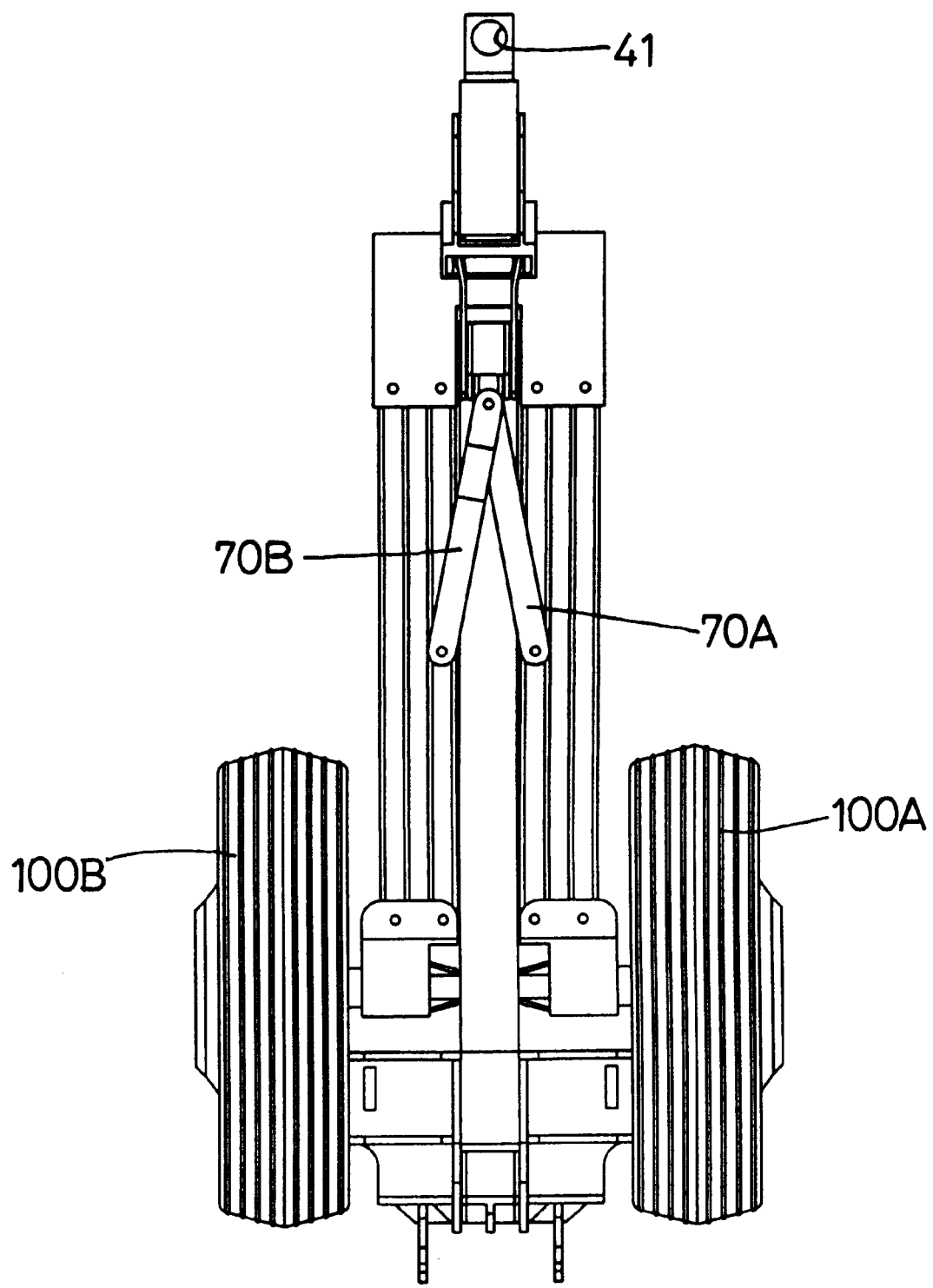
FIG. 11 is a rear view of the golf club cart with the collapsible device in the collapsed condition in the present invention.

When the golf club cart in the spread condition shown in FIG. 4 is to be collapsed to the collapsed condition shown in FIGS. 8, 9, 10 and 11, firstly the female connector 40 pivotally connected to link member 42, is disengaged from the male connector 30 pivotally connected to link member 32. Next, the upper end of the upper support rod 10 is pulled down with the pivotal connected point of the female connector 40 and the upper support rod 10 as a pivot. Then the upper connect rods 50a, 50B are pulled upward, forcing the intermediate connect rod 60 also lifted upward and the two lower connect rods 70A, 70B also lifted upward to form an inverted V-shaped collapsing condition. Meanwhile the upper support rod 10 and the lower support rod 20 move nearer to two wheels 100A, 100B, which moves nearer to each other. After the two wheels 100A, 100B are collapsed to the nearest position, the intermediate connect rod 60 and the two lower connect rods 70A, 70B are positioned high after collapsing, as shown in FIGS. 8, 9, and 11. Consequently, a rather large space is formed between the two wheel hangers 80A, 80B and the two wheel shafts 101A, 101B for an electric driving mechanism to be installed therein. When the golf club cart is spread in the spread condition, engagement of the male connector 30 and the female connector 40 effects a stabilizing function to the upper and the lower support rod 10 and 20, easy and quick to handle.

The golf club cart collapsible device in the present invention, compared with the known conventional one, has two conspicuous improved advantages as follows.

1. Easy and quick handling in spreading and collapsing. It can be stabilized at once when it is spread from the collapsed condition by means of engagement of the male connector and the female connector, while the known conventional one has to pull the connector to rest on the upper support rod and the lower support rod and then the tightener has to be managed to tighten the connector on the upper and the lower support rod.

2. It has enough space for an electric driving mechanism after collapsed. The known conventional one has hardly space between the two wheel hangers and the two wheel shafts for an electric driving mechanism. So the present invention is able to be equipped with an electric driving mechanism for electrically moving it instead of manually moving.

I claim:

1. A golf club cart collapsing device comprising:

an upper support rod;

a lower support rod collapsibly connected to a lower end of said upper support rod in a straight sloped condition;

first and second link members extending from opposite sides of an H-shaped frame;

a male connector pivotally connected to the first link member;

a female connector pivotally connected to the second link member, having an engaging means to engage with said male connector, and said male connector also having an engaging means so that said male connector and said female connector may engage with each other to keep said upper and said lower support rod in a straight line;

first and second upper connect rods respectively pivotally connected to said male connector and said female connector;

an intermediate connect rod pivotally connected to lower ends of said first and second upper connect rods;

first and second lower connect rods each having an inner end pivotally connected to said intermediate connect rod;

first and second wheel hangers having their central portions respectively pivotally connected to outer ends of said first and second lower connect rods;

said H-shaped frame having first and second side ends respectively pivotally connected to upper ends of said first and second wheel hangers; and, first and second wheels each having a shaft respectively pivotally connected to lower ends of the first and second wheel hangers.

2. The golf club cart collapsing device as claimed in claim 1, wherein said engaging means of said male connector is a male projection and said engaging means of said female connector is a female hole for said male projection to engage with.

* * * * *